Jan. 21, 1958  R. S. MARSDEN, JR  2,820,945
FLAME TURBULENCE ANALYZER
Filed Sept. 14, 1953  4 Sheets-Sheet 1

INVENTOR.
R. S. MARSDEN, JR
BY Hudson + Young
ATTORNEYS

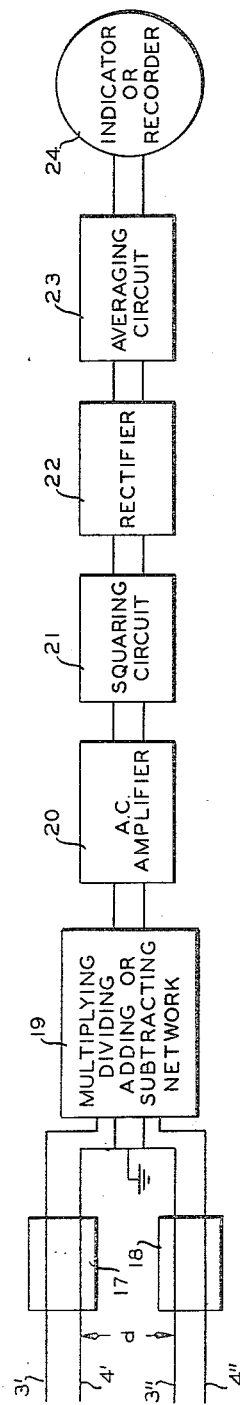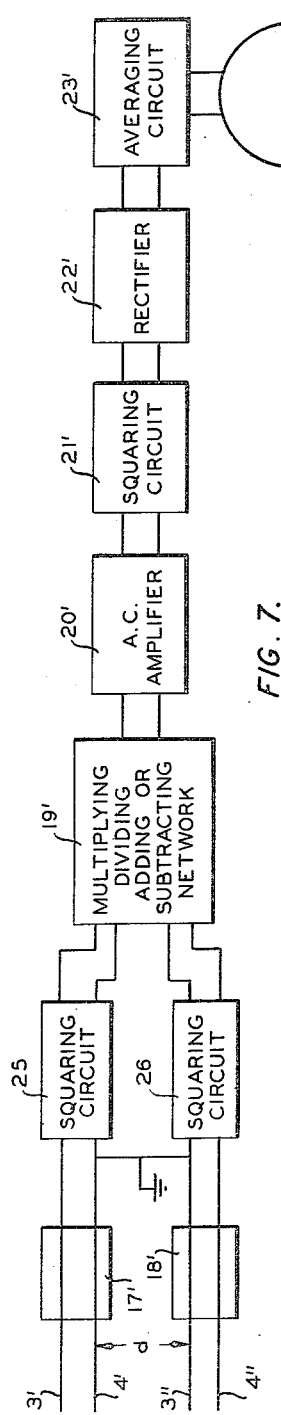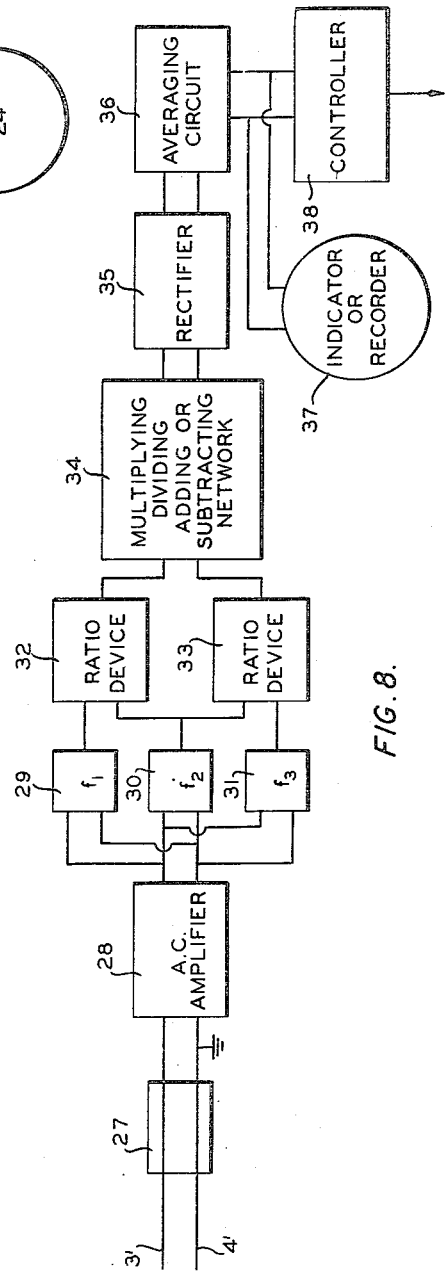

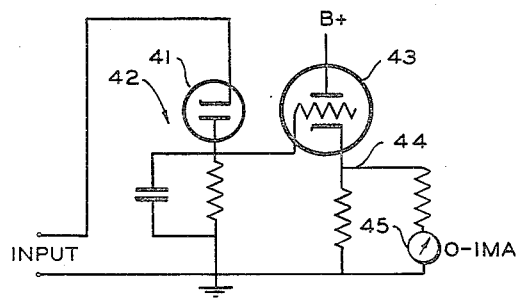
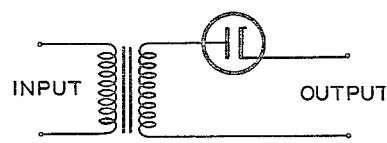
FIG. 9.  FIG. 10.
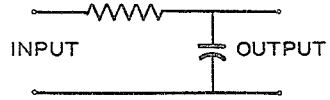
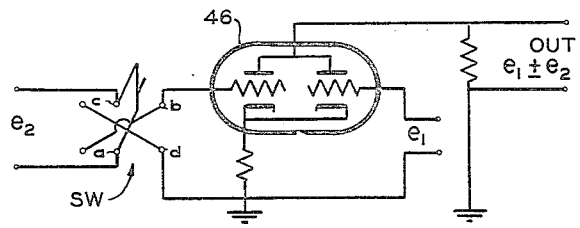
FIG. 11.  FIG. 12.
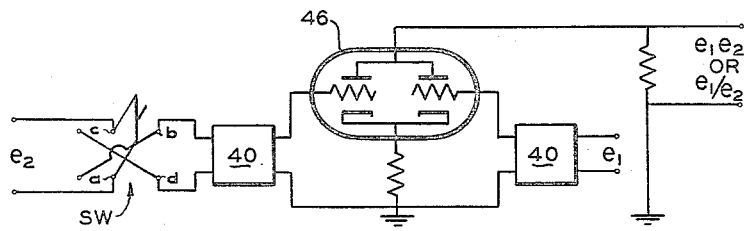
FIG. 13.
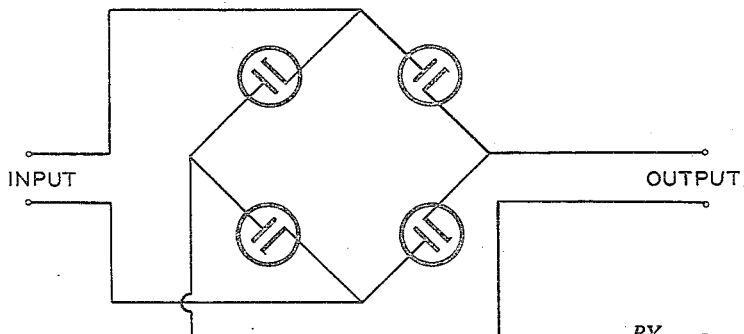
FIG. 14.
INVENTOR.
R. S. MARSDEN, JR.
BY Hudson + Young
ATTORNEYS Jan. 21, 1958  R. S. MARSDEN, JR  2,820,945
FLAME TURBULENCE ANALYZER
Filed Sept. 14, 1953  4 Sheets-Sheet 4

INVENTOR.
R. S. MARSDEN, JR
BY
ATTORNEYS

United States Patent Office 2,820,945
Patented Jan. 21, 1958

2,820,945
FLAME TURBULENCE ANALYZER

Ross S. Marsden, Jr., Bartlesville, Okla., assignor to Phillips Petroleum Company, a corporation of Delaware Application September 14, 1953, Serial No. 379,755

8 Claims. (Cl. 324—33)

This invention relates to a flame turbulence analyzer. In another aspect, it relates to flame analysis based on flame turbulence. In still another aspect, it relates to a method of control based on flame turbulence. In still another aspect, it relates to a method of flame analysis and to a device for making said analysis.

When a pair of electrodes connected externally through a resistor is placed in a turbulent ionized flame an erratic voltage is developed across the resistor. This voltage will henceforth be referred to as flame noise voltage. The term noise is used here to indicate a random process and does not refer to any sound or audible noise.

When a probe (pair of electrodes or flame noise detector) is placed in a flame, the signal may result from an ion distribution which produces a potential difference between the two electrodes. If one electrode is grounded, an alternative view is that an excess of charge leaves or enters the region of the undergrounded electrode causing a current to flow in the external resistor. If a constant charge per unit volume Q of a gas is assumed and the gas flows past the electrodes at a velocity V, then from either viewpoint there will be no flame noise in spite of the fact that a current equal to QV per unit area can be considered as flowing in the gas.

If the gas has a net charge and is accelerated, then there will be an excess of ions leaving or entering the high voltage electrode and a voltage will result. The acceleration will produce a divergence and the region of the electrode can then be considered as an ion source. No matter how highly ionized the gas, there will be no flame noise unless there is a separation of the positive and negative ions which causes regions of the flame, large compared to the mean free path, to have a net charge. Otherwise such regions will be electrically neutral and only thermal noise will result from the lack of electrical neutrality over very short distances. The flame as a whole has an equal number of positive and negative ions; however, there are a number of ways in which the charge separation necessary to account for the magnitude of the observed flame noise may be reproduced.

For some time it generally has been known that there exists a random motion of electrical charges within any electrical conductor. This motion, called "thermal agitation," establishes spontaneous voltage fluctuations across the end terminals of the conductor; and it can be shown that the voltage set up as a result of this random motion of electrical charges are a function of the temperature of the conductor, its resistance and the frequency band width over which the voltage fluctuations are measured. This relationship is expressed mathematically by the Nyquist formula: $\bar{E}^2 = 4KTR\Delta F$, where $\bar{E}^2$ equals the root-mean-square voltage fluctuations across the terminals of the conductor, K is Boltzman's gas constant, T is the absolute temperature, R is the resistance of the conductor and $\Delta F$ is the frequency band width over which the voltage fluctuations are measured. However, this relationship holds true only for a passive circuit, that is, one in which no non-thermal current flows through the conductor being measured. If the circuit is held completely passive, an unknown temperature can be measured by a procedure such as that disclosed in the copending application of R. S. Marsden, Jr., and D. R. de Boisblanc, Serial No. 220,115, filed April 7, 1951, based upon this thermal noise phenomenon.

If, on the other hand, any external source of current enters the circuit of the particular conductor being measured, the above-mentioned relationship no longer holds since this external current creates a second electrical noise effect in the conductor which is not related directly to the temperature of the conductor. Common sources of error which must, therefore, be guarded against in using the above relationship in measuring temperature are the effect of thermionic emission from the conductor and the effect of external ions striking said conductor. It has been discovered that if external ions strike the conductor, the indicated signal no longer represents temperature, but rather has an amplitude many times that of the pure thermal noise signal. Thus, by measuring the electrical noise created by ions impinging upon the surface of a conductor, it is possible to obtain an indication of the activity of the ions striking said conductor.

In any given resistance element having two electrodes connected thereto, one of which is grounded, there normally exists a constant distribution of potential at all points throughout said resistance element. If a charged particle is brought into contact with the surface of this resistance element, a current flows in said element until all points therein are once again at zero or ground potential. During the time when current is flowing, that region of the resistance element in the neighborhood of the ungrounded electrode exhibits a potential variation which depends upon the magnitude of the charge of the particle striking said element, the resistance of the element and the geometric relation of the ungrounded electrode with respect to the grounded electrode. This potential variation is measured in accordance with the procedure of copending application of D. R. de Boisblanc, Serial No. 220,113, filed April 9, 1951.

I have now found that the output of a flame noise detector is dependent upon both ionization and flame turbulence. If both ionization and the flame noise signal are determined independently, turbulence can then be calculated from the following equation:

$$T = K \frac{F}{I}$$

where $T$ = relative turbulence, $K$ = constant of proportionality, $F$ = flame noise detector output signal and $I$ = ionization current.

An object of this invention is to provide a method for determining the turbulence in a flame.

A second object of this invention is to provide an apparatus for determining flame turbulence.

Another object of this invention is to provide a method and apparatus to determine the scale of the flame turbulence.

Still another object of this invention is to provide a method whereby the flame characteristic as determined by this invention is utilized to control the reaction system producing the turbulent flame.

Figure 6 shows, in block diagram, a circuit for adding and subtracting flame noise detector output at various points within the reaction system.

Figure 7 shows, in block diagram, an alternative circuit for adding and subtracting flame noise detector output at various points within the reaction system.

Another alternative for Figure 7 is to replace squaring circuits with circuits for taking absolute value.

Figure 8 shows how fluctuations in flame turbulence can be used to control the reaction producing the flame.

Figure 9 is a schematic wiring diagram of a typical indicator including the rectifying and integrating circuits.

Figure 10 is a schematic wiring diagram of a typical rectifier.

Figure 11 is a schematic wiring diagram of a typical integrating or averaging circuit.

Figure 12 is a schematic wiring diagram of a typical adding or substracting circuit.

Figure 13 is a schematic wiring diagram of a typical multiplying or dividing circuit.

Figure 14 is a schematic wiring diagram for a full wave rectifier which is a typical absolute value detector.

Figure 15:
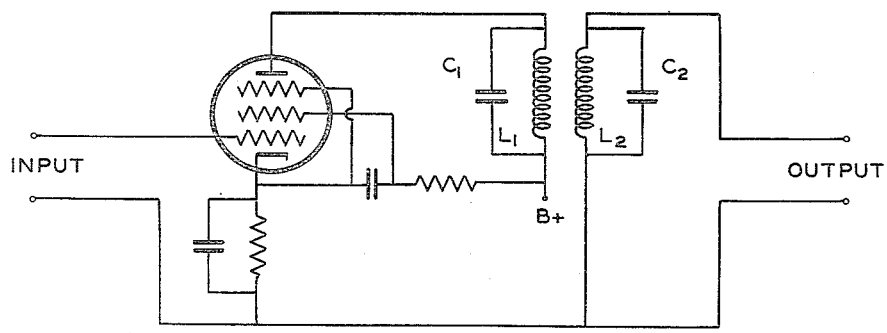

Figure 15 is a schematic wiring diagram for a typical frequency filter.

Figure 16:
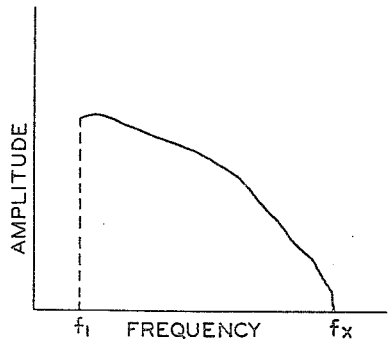

Figure 16 is a curve obtained when the amplitude of frequency separated from a turbulent flame is plotted against that frequency.

Figure 17:
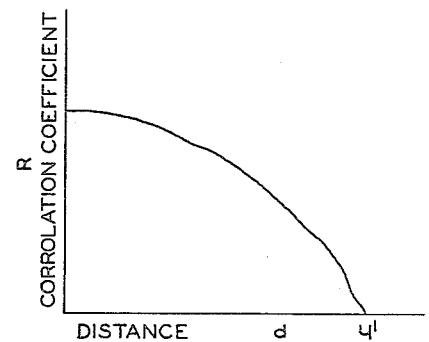

Figure 17 is a curve obtained when the correlation coefficient R is plotted against the distance separating two flame probes and one probe remains stationary while the other probe is moved over a varying distance.

Figure 18:
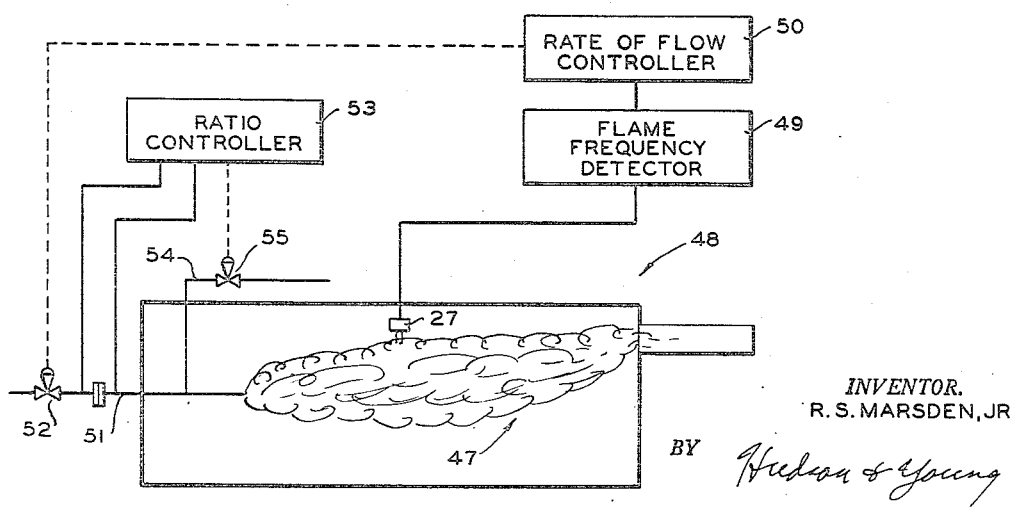

Figure 18 is a schematic diagram illustrating how the apparatus of my invention can be used to control a reaction characterized by a turbulent flame.

I will now describe my invention in more detail in conjunction with the attached figures which are made a part of this specification and disclosure. Although I shall describe my invention by illustrating it with typical circuits, it is to be understood that there are many circuits known in the art for accomplishing the various functions as illustrated. It might be desired to use a recorder in place of an indicator as shown.

Figure 1:
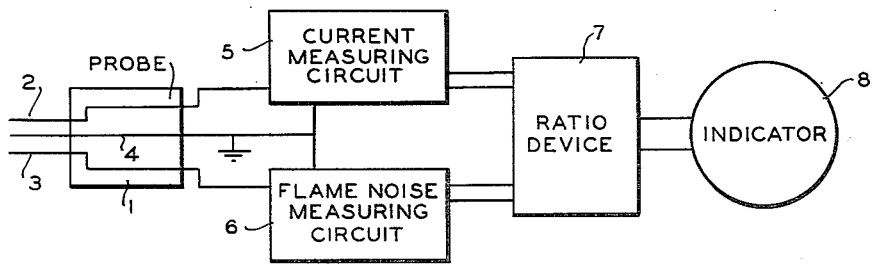
Figure 1 is a block diagram showing an ionization gap circuit (current measuring circuit) and a flame noise detector circuit connected through a ratio circuit so as to give a direct indication of turbulence.

Now referring to Figure 1, a probe 1 is comprised of three spaced conductors 2, 3 and 4. The grounded conductor 4 may be the wall of the reactor. A potential is applied across the gap 2—4 and any current flowing is measured by current measuring device 5 which may be the circuit of Figure 2. Any self-induced current across conductors 3—4 is amplified and measured by flame noise detector circuit 6 which may be one of the types illustrated in Figures 3, 4 and 5. The signals as measured in the current measuring device and as measured in the flame noise detector circuit are fed to a ratio device 7 which may be of the type illustrated in Figure 13 when that device is being used to divide the currents. The indicator 8 is calibrated to compensate for K and therefore reads directly in turbulence. Figure 9 shows a typical indicator circuit.

Figure 2:
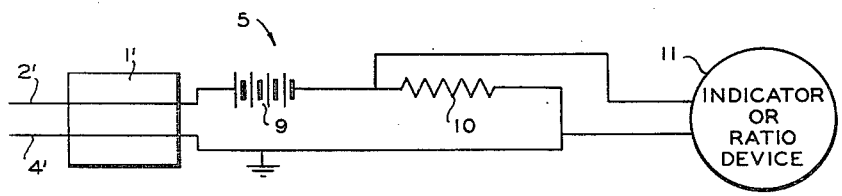
Figure 2 shows a typical ionization gap circuit.

Now referring to Figure 2, which shows one embodiment of the measuring circuit 5, Figure 1, the probe 1' is comprised of conductors 2' and 4'. These parts are equivalent to parts 1, 2 and 4 of Figure 1. A battery 9 supplies a voltage across the ionization gap 2'—4', and is connected in series with a resistor 10. When a current flows, the voltage drop across resistor 10 is registered by indicator or ratio device 11'. Although we are interested in current 1, a measurement of voltage V will suffice since current is a function of voltage. Since the resistance R of resistor 10 is known, then we can use the relationship.

$$I = \frac{V}{R}$$

where $I$ = current in amperes.
$V$ = electromotive force in volts.
$R$ = resistance in ohms.

Figure 3:
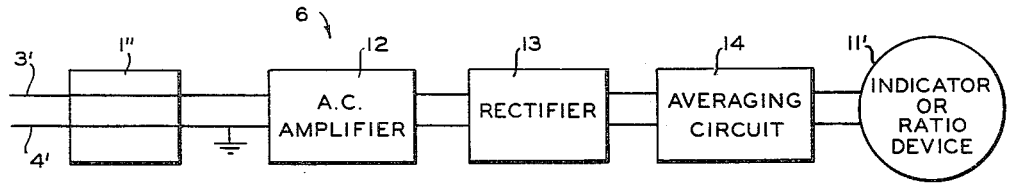
Figure 3 shows, in block diagram, a typical flame noise detector circuit.

Now referring to Figure 3, which shows one embodiment of circuit 6, Figure 1, the probe 1" is comprised of conductors 3' and 4'. These parts are equivalent to parts 1, 3 and 4 of Figure 1. The probe output is fed successively through an alternating current amplifier 12, a rectifier 13 and an averaging circuit 14 to an indicator 11' which may include a ratio device. The A. C. amplifier 12 may be of any type known to the art. I prefer to use the A. C. amplifier of Parsons et al. in co-pending application Serial No. 272,146, filed February 18, 1952. The rectifier 13 can be of the type illustrated in Figure 10. A full wave rectifier as shown in Figure 14 can be used in place of this half wave rectifier if it is so desired. The averaging (integrating) circuit 14 can be of the type illustrated in Figure 11. Any self-induced current across 3'—4' will be amplified, rectified, averaged and finally registered in the indicator or ratio device 11', the output being representative of the flame noise voltage.

Figure 4:
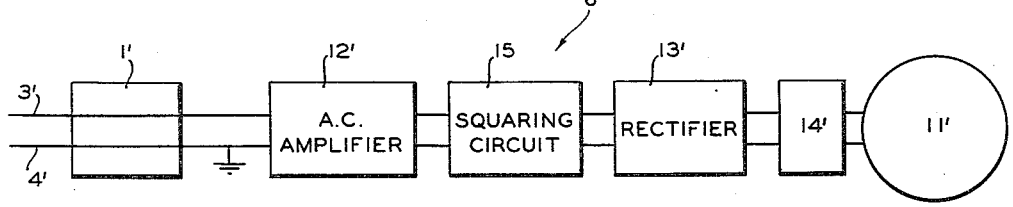
Figure 4 shows, in block diagram, an alternative flame noise detector circuit.

Now referring to Figure 4, a squaring circuit 15 has been inserted between the A. C. amplifier 12' and the rectifier 13'. This squaring circuit may be of any general type such as are well known in the art. I prefer to use a squaring circuit as disclosed by de Boisblanc et al. in co-pending application Serial No. 187,614, filed September 29, 1950, and issued as Patent No. 2,643,348 on June 23, 1953.

By squaring the circuit, both positive and negative flow of current will read in a single direction. A second advantage of using the squaring circuit is that it permits the instrument to be used as a temperature measuring device in a passive flame in accordance with the Nyquist equation as has hereinbefore been described.

Figure 5:
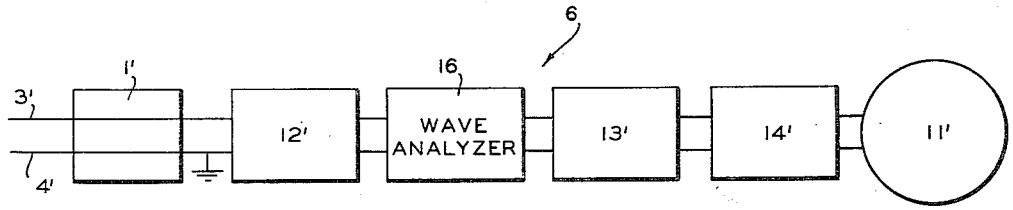
Figure 5 shows, in block diagram, another alternative flame noise detector circuit.

Now referring to Figure 5, a wave analyzer 16 has been inserted between the A. C. amplifier 12' and the rectifier 13'. This wave analyzer can be of any of the well known types known in the art. By measuring the amplitude of the signal at different frequencies as is done in this embodiment, the nature of the turbulence can be determined.

Now referring to Figure 6, the two probes 17 and 18 are used. These probes are connected with an adding, subtracting, multiplying and dividing circuit 19 either used to add the two currents or to subtract one from the other and does not do both simultaneously. A switching arrangement is provided so as to switch from one to the other as described in connection with the discussion of Figure 12. However, circuits could be provided to do both simultaneously. The added or subtracted current then passes to A. C. amplifier 20, squaring circuit 21, rectifier 22, averaging circuit 23 and to the indicator 24. The advantage of the embodiments of Figures 6 and 7 will be described in greater detail hereinbelow.

In Figure 7, squaring circuits 25 and 26 have been inserted between the probes 17' and 18' and the adding, subtracting, multiplying and dividing networks 19'. In place of the squaring circuits 25 and 26 an absolute value detector could be used. The absolute value detector could be of a circuit of the type shown in Figure 14. This squaring circuit is provided to insure that the reading from both probes 17' and 18' will read in the same direction.

Figure 8 shows a block diagram circuit utilizing a flame characteristic to control the reaction producing the said flame. The probe 27 is connected to A. C. amplifier 28 which is in turn connected to a plurality of frequency filters and in the embodiment shown three filters 29, 30 and 31 are shown. These frequency filters can be of the type shown in Figure 15. The signal from the frequency filters are then fed to a plurality of ratio devices (32 and 33) and thence to a circuit to multiply, divide, add or subtract, 34. This circuit is made up of a multiply and divide circuit (Figure 13) and an add and subtract circuit (Figure 12) with suitable switching arrangement to accomplish the desired purpose. The signal is then fed to rectifier 35, averaging circuit 36 to resulting current is indicated or recorded by means of the indicator-recorder 37. The signal leaving the integrating circuit 36 also leads to a controller 38. This controller may be of any commercial or special design responsive to an electrical impulse. The advantage of this embodiment is described in conjunction with the examples given hereinbelow.

Figure 9 is a typical indicator circuit showing the rectifier tube 41, the averaging circuit 42, a triode tube 43 connected with the cathode follower 44 to an indicating galvanometer 45. These circuits are well known in the art and should require no further discussion.

Figure 10 is a typical rectifying circuit as it well known in the art.

Figure 11 is a typical averaging circuit as is well known in the art.

In Figure 12 the switch $Sw$ is provided so that when $a$ contacts $b$, then $c$ contacts $d$ and when $a$ contacts $d$, then $c$ contacts $b$. By this arrangement, the input signals $e_1$ and $e_2$, such as would be detected by probes 17 and 18 of Figures 6 and 7, can be added together, or the signal from one can be subtracted from the other, that is when the potential to the grids in tube 46 are in the same direction, the signals will be added, if the potential to one grid is reversed, then the signals will be subtracted.

In Figure 13 a similar switching arrangement is provided. However, since the logarithmic attenuators 40 have been added, the $e_2$ and $e_1$ signals will be either multiplied or divided.

The logarithmic attenuator may be of any type known in the art and commercially available. The logarithmic attenuator output is a logarithmic function of the input signal. Therefore by adding these output signals in tube 46 we have a function of the multiple of the two signals. If the signals are subtracted then we have a function of the ratio of the two signals.

Figure 14 is self-explanatory and is basically a full wave rectifier.

Figure 15 is a typical circuit for a frequency filter. The values for $L_1$, $L_2$, $C_1$ and $C_2$ are so selected that the desired frequency signal will pass to the output in accordance with $$f = \frac{1}{2\pi\sqrt{L_1 C_1}} = \frac{1}{2\pi\sqrt{L_2 C_2}}$$

where L is inductance, C is capacitance and $f$ is frequency.

As has hereinbefore been pointed out, the circuits described are illustrative only and in no sense limit the scope of the invention. It will be obvious to those skilled in the art that many modifications can be made in the circuits disclosed and still accomplish the same purpose. For example, the probes may be one wire only wherein the ground or neutral conductor would be the wall of the reaction vessel.

To further illustrate my invention, the use of the above described circuits will be described.

The probe of Figure 2 is placed in the reaction flame. An applied E. M. F. (electromotive force) from a source such as battery 9 is placed across the gap 2—4. Since a flame is ionized, a current will flow. This current can be determined by measuring the voltage drop across a known resistance 10 by use of the equation $$I = \frac{V}{R}$$

wherein I is current in amperes, V is E. M. F. in volts and R is resistance in ohms. The amount of current flowing is proportional to the ionization of the flame. It is obvious, therefore, that by a circuit shown in Figure 2 the amount of ionization can be determined.

Now if the probe of Figure 3 or 4 is inserted in the flame at the same position as was the probe of Figure 2, a self-induced current due to phenomenon earlier described will be produced. This current can be amplified, rectified, integrated and measured by a circuit shown in Figures 3 and 4. Now since the relative turbulence is proportional to $$\frac{F}{I}$$

where F is the flame noise detector signal and I is the ionization current, the information taken from the circuit of Figure 2 and that taken from the circuit of Figures 3 and 4 can be utilized to calculate this relative turbulence.

Now if the circuit of Figure 2 is combined with the circuit of Figure 3 or Figure 4 through a ratio device (dividing circuit) as is done in Figure 1, then this turbulence value T can be determined directly from an indicator or recorder properly calibrated. In using such an instrument for flame analysis, the probe would be placed at various points in the flame and the relative turbulence should then be indicative of the reaction performance. A reaction pattern could be established for optimum conditions.

By use of the wave analyzer 16 of Figure 5, still another property of the reaction flame can be determined. If the amplitude of the flamometer signal is plotted against the various frequencies a curve characteristic of the reaction will be shown as plotted in Figure 16. Any change in the frequency curve would indicate a change in reaction conditions.

In order to define the space scale of turbulence, it is necessary to compare the turbulence at different positions within the turbulent zone. Probe 17 of Figure 6 could be fixed in the reaction chamber, while probe 18 would be free to move. The output from these two circuits could be added and subtracted and the correlation coefficient R can be calculated from the following equations:

(1) $$R_1 = \frac{(e_1 + e_2)^2 - (e_1 - e_2)^2}{(e_1 + e_2)^2 + (e_1 - e_2)^2}$$

(2) $$R_2 = \frac{(e_1^2 + e_2^2)^2 - (e_1^2 - e_2^2)^2}{(e_1^2 + e_2^2)^2 + (e_1^2 - e_2^2)^2}$$

(3) $$R_3 = \frac{(|e_1| + |e_2|)^2 - (|e_1| - |e_2|)^2}{(|e_1| + |e_2|)^2 + (|e_1| - |e_2|)^2}$$

where $e_1$ is the voltage generated across one probe and $e_2$ is the voltage generated across the other probe. The parallel lines || indicate the absolute values of $e_1$ and $e_2$ are to be used.

$(e_1+e_2)^2$ and $(e_1-e_2)^2$ can be readily determined by the embodiment of my invention as is shown in Figure 6. For example, if $e_1$ is the signal detected by the electrodes 3'—4' of probe 17 and $e_2$ is the signal detected by the electrode 3" and 4" of probe 18, these signals could first be added and the sums squared and then they could be subtracted and the difference squared. This information can be readily substituted in Equation 1 and $R_1$ determined.

By inserting squaring circuits between the probes and the adding and dividing circuit as is done in the embodiment of my invention as shown in Figure 7 $(e_1^2+e_2^2)^2$ and $(e_1^2-e_2^2)^2$ can readily be determined. These values would be substituted in Equation 2 above and $R_2$ determined.

If the squaring circuits 25 and 26 of the embodiment of my invention shown in Figure 7 were replaced by absolute value detecting circuits, then $(|e_1|+|e_2|)^2$ and $(|e_1|-|e_2|)^2$ can readily be determined and substituted in Equation 3 above.

It is within the scope of my invention to use additional adding, subtracting and dividing circuits so that R could be read directly.

The R value as determined by the above equations is valuable in determining the space scale of turbulence.

Space scale of turbulence is defined by the following mathematical equation:

$$(4) \quad l = \int_0^{y'} R\,dy$$

where $l$ is the space scale, $R$ is the space correlation coefficient, and $y'$ is the distance $d$ beyond which $R$ is negligible. Space scale is indicative of the average size of eddies in a turbulent current. The space scale can be obtained by measuring R as a function of distance. For example, R can be determined as indicated above when probes 17 and 18 are at some distance $d$ apart. One probe could be moved so that the probes are at a different $d^1$ and R determined. This process can be continued until the distance approaches $y'$. Thus R could then be plotted against $d$ as is done in Figure 17 and the area under the resulting curve would represent the space scale of turbulence.

As was hereinbefore stated in connection with the description of the embodiment of Figure 5, a curve of signal amplitude versus frequency can be plotted. In most reaction systems, three or more points will define that curve. The embodiment of Figure 8 shows how that property can be utilized. The probe 27 is placed in the reaction flame. The frequency filters, $f_1$, $f_2$, and $f_3$, are so selected that they will define the desired curve. It is understood that additional filters can be used if additional points are required. Now, if these frequencies define a given curve, then the frequencies must have a definite ratio to each other. Therefore, a ratio is taken on each pair of frequencies and further ratio taken until only two signals remain. These two signals may be further divided, multiplied, added or subtracted as desired and the resulting signal used to operate a controller for the reaction system. The working example below shows how this embodiment can be utilized in a reaction system.

*Example of use of turbulence measurements in controlling combustion processes*

In certain types of combustion processes such as the manufacture of acetylene and carbon black the mixing is very important. To a large extent this mixing may depend upon the turbulence. Thus in order to maintain a uniform product it is necessary to maintain a constant intensity and scale of turbulence.

If optimum conditions are established the proposed method will permit establishing an empirical rating for the turbulence. If further the parameters controlling the turbulence are determined then the method can be used to keep the turbulence rating constant.

For example, in the manufacture of acetylene by partial oxidation it is found that the ratio of the hydrocarbon feed rate to the oxygen feed rate must be kept fixed and that the mixing is determined by the total rate. An ionization gap placed within a turbulent portion of the flame can then be used to pick up the electrical noise generated by the flame. This noise can then be used to give a voltage proportional to the intensity or scale. This in turn can be used to control the feed rate. This embodiment can be further explained by referring to Figure 18.

Now referring to Figure 18, the probe 27 is inserted in a turbulent flame 47 within the reaction zone 48. The said probe picks up a signal from the turbulent flame and said signal is conducted to a flame frequency detector 49. The flame frequency detector 49 represents all of Figure 8 from A. C. amplifier 28 to averaging circuit 36, inclusive. The rate of flow controller 50 is responsive to the output of the flame frequency detector and in turn controls the flow of one reactant through conduit via means of valve 52. A ratio controller 53 then controls the flow of the other reactant through conduit 54 via means of valve 55 and responsive to the rate of flow of the first reactant through conduit 51.

I have described my invention in terms of several of its embodiments. Those skilled in the art will see many modifications and uses for this invention which can be made without departing from its scope.

I claim:

1. A circuit for flame analysis which comprises, in combination, two pair of closely spaced electrodes adapted to be positioned in a turbulent flame zone and adapted to be moved known distances apart, a computer, constructed and arranged to perform a mathematical operation upon a plurality of signals thereto, means for feeding current, generated across the terminals of the two pair of electrodes generated by random motion in said turbulent flame, to said computor, means for amplifying the resulting signal from said computor, means for squaring the amplified signal, means for rectifying the squared signal, means for averaging the rectified signal, and means for indicating the resulting signal.

2. In the apparatus of claim 1, means for squaring the two signals from the said electrodes before performing the mathematical operation.

3. In the apparatus of claim 1, the computor being a multiplying circuit.

4. In the apparatus of claim 1, the computor being a dividing circuit.

5. In the apparatus of claim 1, the computor being an adding circuit.

6. In the apparatus of claim 1, the computor being a subtracting circuit.

7. A measuring circuit which comprises, in combination, a flame detector having a pair of spaced electrodes adapted to be positioned within a turbulent flame zone, an amplifier having an input circuit connected to said electrodes and responsive to the spontaneous potential across said electrodes, a plurality of filters each constructed to pass signals within a predetermined frequency range and to reject signals of other frequencies, means for feeding the output of said amplifier to all of said filters, a first ratio device connected to one pair of said filters to produce a voltage representative of the ratio of the outputs of said pair of filters, a second ratio device connected to another pair of said filters, a computer, constructed and arranged to perform a mathematical operation upon a plurality of signals fed thereto, means for feeding the outputs of both ratio devices to said computer, and means for indicating the output of said computer.

8. A circuit for flame analysis which comprises, in combination, a first pair and a second pair of closely spaced electrodes adapted to be positioned in a turbulent flame zone, means connected to said first pair of electrodes to produce an output representative of the self-induced current appearing thereacross, said output thereby indicating the flame noise voltage, means connected to said second pair of electrodes to produce an output representative of ionization current thereacross, a computer connected to both of the last-mentioned means, said computer being constructed and arranged to perform a mathematical operation on said outputs to produce a resultant signal, and an indicator responsive to said resultant signal.

References Cited in the file of this patent

UNITED STATES PATENTS

| | | |
|---|---|---|
| 2,374,610 | MacLaren | Apr. 24, 1945 |
| 2,517,976 | Clarke | Aug. 8, 1950 |
| 2,560,734 | Mouzon | July 17, 1951 |
| 2,586,291 | Bender | Feb. 19, 1952 |